UNITED STATES PATENT OFFICE.

REYNOLD J. KIRKLAND, OF GRAND RAPIDS, MICHIGAN.

COMPOSITION OF MATTER FOR COPYING.

SPECIFICATION forming part of Letters Patent No. 686,661, dated November 12, 1901.

Application filed March 21, 1901. Serial No. 52,255. (No specimens.)

*To all whom it may concern:*

Be it known that I, REYNOLD J. KIRKLAND, a citizen of the United States, residing at Grand Rapids, in the county of Kent and State of Michigan, have invented new and useful Improvements in Compositions of Matter for Copying, of which the following is a specification.

My invention relates to a composition of matter for copying or reproducing prints, drawings, circulars, &c. It has been customary to make such reproductions by using as a negative and printing therefrom a gelatinous pad upon which the image was impressed from the original and from which it was taken off in the reproductions. Such copying devices have been known commercially in their different forms as the "hectograph," "moonstone," &c. The various compositions of matter used in these various devices are essentially gelatinous and remain in some degree soft, absorptive, and adhesive. It results from their composition that in many cases the image impressed thereon will soon fade away, and in other cases the matter is not capable of use in a thin sheet, but a thick pad must be used from which the impressed image must be washed away before the pad is used again.

My composition of matter is especially designed to apply to thin sheets of absorbent material, which thin sheets when so prepared may be furnished to the user in any desired form or size and may be used for reproducing the desired matter and then may be preserved like a negative or a stereotype plate and used further to reproduce the same matter at a later date, although the composition may be made up for use in other forms, as circumstances may dictate.

The base of my composition is chondrin or any other substance equivalent thereto. This chondrin may be prepared from cartilage or bones or in any other suitable manner, or I may use those commercial glues which have a sufficient amount of chondrin in their composition. This chondrin alone would be hard and unsuitable for the desired use. I therefore mix with it some other substance designed to make a compound which is somewhat elastic and absorbent and which can be flowed upon a sheet of absorbent material and can otherwise be applied in the desired forms. I have found the official preparation of glycerite of starch very suitable for this purpose, and when mixed with chondrin, one part of each, I have obtained the best results. The composition formed by these two elements can be flowed upon a sheet of paper and will serve as a copying medium for anilin inks in the usual manner. It is soft and adhesive and not suitable for use in the permanent way in which the negative or sterotype plate is employed. To adapt it to these purposes, I apply to it a suitable hardening solution which will precipitate or coagulate the chondrin. This may be accomplished by any mineral acetate and by certain alums and doubtless in other ways. I have found a three-per-cent. solution of acetate of lead most convenient and effectual. The application of this solution causes the composition previously existing to change considerably its nature. While retaining its capacity for copying, it becomes much harder and capable of permanent preservation, and allows handling without injury, and while remaining cohesive it becomes much less adhesive, so that many sheets when so treated can be piled together after drying without adhering to each other and without injury. When it is desired to use the same for copying purposes, a temporary application of water makes them temporarily sufficiently soft and elastic for the purpose, and they can continue to be used until they again become dry.

In the preparation of the combination I first dissolve the chondrin in water and then add the glycerite of starch. It is convenient but not essential to unite the two while the glycerite is in the process of formation. I then flow the composition while hot upon the surface upon which it is to be used, likewise heated, finding it often desirable to make two applications, the first for saturating and the second for surfacing. I then allow this to solidify by cooling and thereafter apply the hardening solution, a portion of which when heat is again applied unites with the existing composition and forms a new combination and a new composition which has the qualities and advantages which I have pointed out.

I do not regard the exact proportions of the different ingredients as material, and I can use other equivalent materials in the composition, as I have pointed out.

What I claim to have invented, and desire to secure by Letters Patent, is—

A composition of matter for a copying or reproducing surface composed of a base of chondrin united with a viscous body, and having the chondrin coagulated or precipitated by a suitable agent, substantially as described.

In testimony whereof I have hereunto set my hand in presence of two subscribing witnesses.

REYNOLD J. KIRKLAND.

Witnesses:
ARTHUR C. DENISON,
CHAS. M. WILSON.